United States Patent [19]

Neu

[11] Patent Number: 4,830,596

[45] Date of Patent: May 16, 1989

[54] VACUUM THERMOFORMING ROTARY MACHINE

[76] Inventor: Stephen T. Neu, 228-4 Crittenden Way Apts., Rochester, N.Y. 14623

[21] Appl. No.: 140,747

[22] Filed: Jan. 4, 1988

[51] Int. Cl.$^4$ .................... B29C 51/10; B29C 51/22
[52] U.S. Cl. .................... 425/388; 425/394; 425/405.2; 425/407
[58] Field of Search ............. 425/328, 362, 335–337, 425/387.1, 388, 394–396, 407–410, 405.2; 264/320, 322

[56] References Cited

U.S. PATENT DOCUMENTS

| | | | |
|---|---|---|---|
| 3,181,202 | 5/1965 | Martelli et al. | 425/388 X |
| 3,537,138 | 11/1970 | Brown et al. | 425/388 X |
| 3,673,834 | 7/1972 | Brunner et al. | 425/387.1 X |
| 3,673,835 | 7/1972 | Arfert | 425/387.1 X |
| 3,709,967 | 1/1973 | Held Jr. | 425/388 X |
| 3,954,368 | 5/1976 | Kawakami | 425/388 X |
| 4,284,396 | 8/1981 | Thissen et al. | 425/388 X |
| 4,413,964 | 11/1983 | Winstead | 425/388 X |
| 4,579,516 | 4/1986 | Caputo | 425/388 |
| 4,669,969 | 6/1987 | Martelli et al. | 425/388 |

FOREIGN PATENT DOCUMENTS 1435668 3/1966 France ................ 425/388

OTHER PUBLICATIONS

Golding, B., "Polymers and Resins", D. Van Nostrand Co., Inc., Princeton, N.J., 1959, pp. 610–615.
Hanlon, J. F., "Handbook of Package Engineering", 2nd Edition, McGraw-Hill Book Co., New York, 1984, pp. 8-71 to 8-84.
"The Packaging Encyclopedia", 1983, Cahners Publishing Co., Boston, Mass., Package Engineering, vol. 28, No. 4.

Primary Examiner—Richard L. Chiesa
Attorney, Agent, or Firm—Howard J. Greenwald

[57] ABSTRACT

An apparatus for the vacuum thermoforming of a formable thermoplastic material is disclosed. This apparatus is comprised of at least two counter-rotatable, polygonal, substantially contiguous forming bodies, means for rotating the two polygonal forming bodies in a counter-rotatable manner, means for compressing the two polygonal forming bodies so that they are substantially contiguous, and means for disposing a sheet of formable, thermoplastic material between the two polygonal forming bodies.

15 Claims, 3 Drawing Sheets

VACUUM THERMOFORMING ROTARY MACHINE

TECHNICAL FIELD

A forming process in which a sheet of thermoplastic material is formed by use of a rotary, polygonal mold, a rotary polygonal pressure plate, and a vacuum pressure system.

BACKGROUND OF THE INVENTION

Vacuum-thermoforming methods for producing plastic articles are well known to those skilled in the art. These methods use the atmospheric pressure of air to force a heated sheet into an evacuated space. Thus, for example, vacuum thermoforming is described in Brage Golding's "Polymers and Resins," (D. Van Nostrand Company, Inc., Princeton, N.J., 1959), pp. 610-615. Vacuum thermoforming is also described in Joseph F. Hanlon's "Handbook of Package Engineering," Second Edition (McGraw-Hill Book Company, N.Y., 1984), pages 8-71 to 8-84. The disclosure of said Golding and Hanlon books is hereby incorporated by reference into this specification.

In the vacuum thermoforming process, a thermoplastic material is heated until it is formable, contacted with a mold, forced into an evacuated space where it is formed, and then removed from the mold. If the formed thermoplastic material is removed from the mold too readily, then, depending upon the thermoplastic material used, it might undergo a substantial amount of shrinkage. If, however, it is allowed to stay in contact with the mold until it has had more time to cool in order to minimize shrinkage, the mold cannot be used during the cooling cycle, and productivity suffers. To the best of applicant's knowledge, the prior art does not provide a simple, inexpensive machine which minimizes shrinkage of the molded product, allows high productivity, and can easily be incorporated into preexistant conventional machine systems/lines.

U.S. Pat. No. 3,673,834 of Brunner et al. discloses a forming apparatus comprised of lower wheel 22 and upper wheel 23, one of which carries a plurality of female dies and the other of which carries a plurality of male dies. Metallic foil is passed between the lower wheel and the upper wheel. At a specified point in each cycle, which is different for each molding plate, the molding plate is pushed by mechanical means towards the pressure plate, thereby compressing the metallic foil. The molding plate is removed from the pressure plate, and the molded metallic object is removed from the mold. Because the process of the Brunner et al. patent does not appear to be involved with thermoplastic materials, shrinkage does not appear to be a substantial problem. If, however, it were possible to adapt said process for use with thermoplastic materials, shrinkage might be a substantial problem, because the molding plate must be removed from the pressure plate and the formed article must be ejected in order to continue the revolution of the upper and lower wheels. If the process is operated so that the molding plate is not removed from the pressure plate until the molded article has cooled, then productivity will be poor. If, on the other hand, the molding plate is removed from the pressure plate immediately upon the forming of the molded article, then productivity of a molded article with a substantial amount of shrinkage will be high.

U.S. Pat. No. 3,673,835 of Arfert discloses an apparatus similar to that disclosed in U.S. Pat. No. 3,673,834 for use in forming containers from sheet material. In the process of the U.S. Pat. No. 3,673,835, a fluid under pressure is used to move the molding plate towards and against the blank to be formed. As is the case with the 3,673,843 patent, even if the process of this patent could be adapted for use with thermoplastic sheet material, the process would either produce molded articles with substantial shrinkage and/or would have to be run at a very slow speed in order to minimize shrinkage.

U.S. Pat. No. 4,413,964 of Winstead discloses an apparatus for extruding and biaxialy orienting a thermoplastic material. The web of thermoplastic material so formed is passed in contact with a polygonal molding plate with multiple molds in it. The use of a pressure plate with the molding plate is not disclosed, and the patent does not disclose how the thermoplastic material is fed to, formed by, or dispensed by the machine. It appears that, because of said lack of a pressure plate rotated in synchrony with the molding plate, the molded thermoplastic objects will lack suitable definition and uniformity. It will be difficult, if not impossible, to make parts with complicated shapes and/or thick parts with the machine disclosed by this patent.

U.S. Pat. No. 4,284,396 also discloses a forming apparatus which lacks any kind of an ongoing pressure plate system. The apparatus of this patent comprises a round mold drum system and a device for holding the thermoplastic material on the drum while the material is being heated and formed on the drum's molding surface as it advances. As is the case with the process of the U.S. Pat. No. 4,413,984, the process of this patent is not suitable for producing thick parts or parts with complicated shapes or any considerable depth and slight draft.

It is an object of this invention to provide a vacuum thermoforming process which, for a given thermoplastic feed stock and a given degree of productivity, will have substantially lower shrinkage.

It is another object of this invention to provide a vacuum thermoforming process which, for a given thermoplastic feed stock and a specified amount of shrinkage to be tolerated in the process, will run at a substantially higher speed and have substantially greater productivity. This feature is especially desirable when working with heavy guage thermoplastic materials.

It is yet another object of this invention to provide a vacuum thermoforming process which, although it is operated at relatively high speed, produces a molded product which is substantially more uniform.

It is yet another object of this invention to provide a vacuum thermoforming process which is substantially more suitable for producing molded parts with added height.

It is yet another object of this invention to provide a process which produces molded parts with good definition.

It is yet another object of this invention to provide a forming system which can use many, if not all, of the forming techniques which might be required in any particular case to form the precise formed part required.

SUMMARY OF THE INVENTION

In accordance with this invention, there is provided an apparatus for the vacuum thermoforming of a formable thermoplastic sheet material which is comprised of an (1) at least two counter-rotatable polygonal, substantially contiguous forming bodies, (2) means for rotating said two polygonal forming bodies in a counter-rotatable manner, (3) means for compressing said two polygonal forming bodies, and (4) means for disposing a sheet of formable thermoplastic material between said two polygonal forming bodies.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 3 is a perspective view of one material feeding system which can be used in the process of the invention.

DESCRIPTION OF THE PREFERRED EMBODIMENTS

Figure 1:
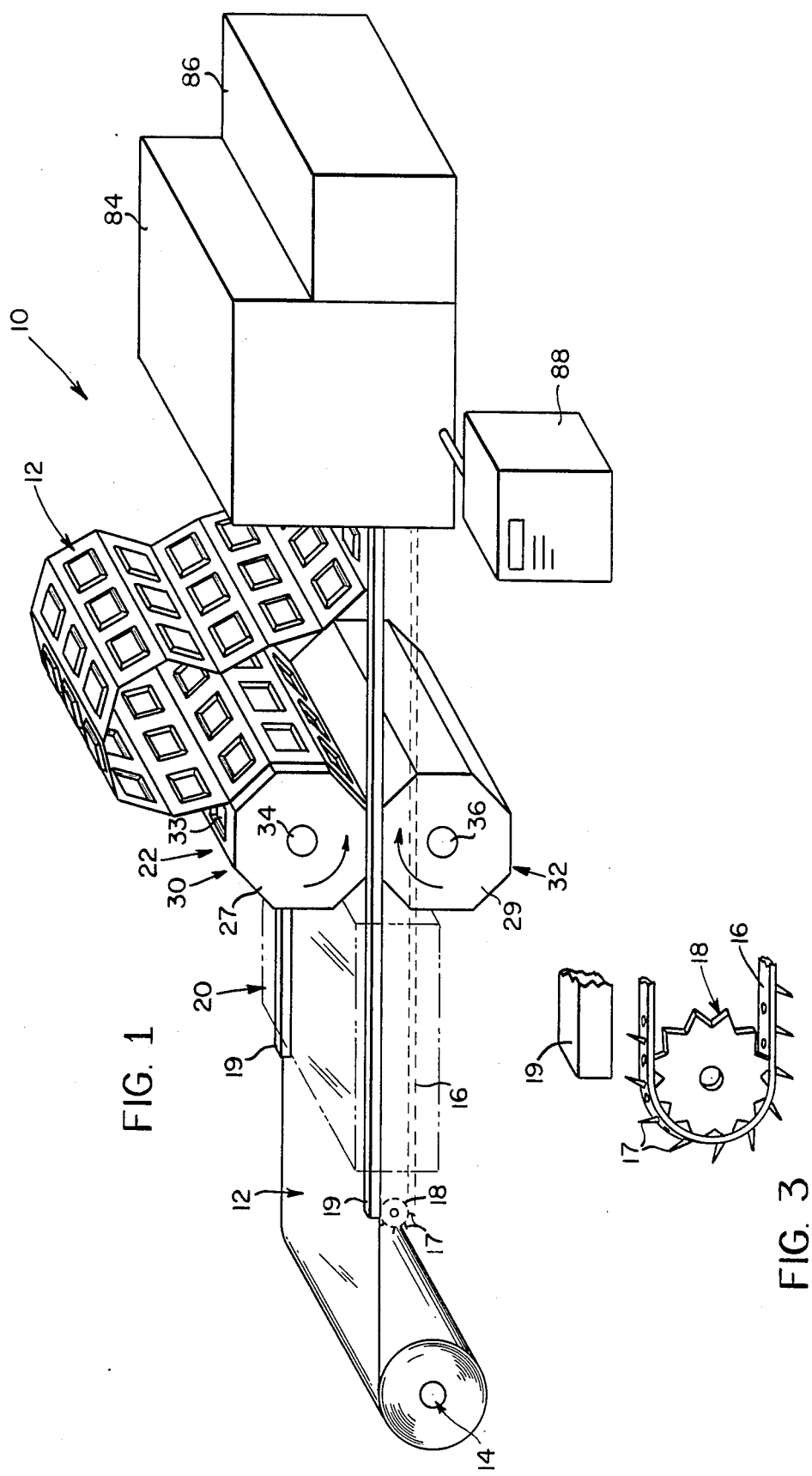
FIG. 1 is a flow sheet illustrating one of the preferred embodiments of the vacuum thermoforming process of this invention.

FIG. 1 illustrates one of the preferred processes of this invention. As is illustrated in FIG. 1, a sheet 12 of formable thermoplastic material is first heated until it is formable and then it is formed into molded parts or articles.

As used in this specification, the term sheet refers to a broad, thin, usually rectangular mass or piece of material. The term thermoplastic refers to a rigid material which temporarily becomes soft when heated and can be molded into a shape which it will retain upon cooling.

By way of illustration and not limitation, some formable thermoplastic materials which can be used in the process of this invention include, e.g., polyethylene, polypropylene, polyvinyl chloride, polystyrene, polybutylene, polycarbonate, nylon, and the like. These materials can be coextruded, laminated, coated, metalized, oriented, of any density, etc. A description of these thermoplastic sheet materials is contained in the Volume 28, No. 4 edition of "Package Engineering" magazine, which is entitled "The Packaging Encyclopedia 1983" (Cahners Publishing Company, Boston, Mass.).

In the embodiment illustrated in FIG. 1, the sheet of thermoplastic material 12 is provided in the form of roll stock; and it is fed by means of rotatable roll feeder 14 to rotatable bar guide advancer 18. The rotatable bar guide advancer 18 is a continuous system with teeth on it which continuously advances the thermoplastic material. The underside of the material is grabbed by the teeth of the chain and advanced to a bar unit, such as bar guide 19, which traps the upper face of the material and holds the sheet stock in place for forming. The rotatable bar guide advancer 18 preferably holds and advances the material throughout the forming cycle.

Referring again to FIG. 1, the sheet of thermoplastic material 12 is fed to heater 20. As will be apparent to those skilled in the art, other forms of thermoplastic sheet stock can be fed into heater 20. Thus, by way of illustration and not limitation, one can use discrete sheets of thermoplastic material and feed them to heater 20. Alternatively, one can use an extruder to extrude a continuous thermoplastic sheet and thereafter feed it into heater 20. Such an extruder apparatus is disclosed in, e.g., U.S. Pat. No. 4,413,964 of Winstead, the disclosure of which is hereby incorporated by reference into this specification.

FIG. 3 is a cut-away, perspective view of the bar guide advancer 18 and bar guide 19 of FIG. 1. As is shown in these Figures, thermoplastic sheet 12 is fed into the rotary forming apparatus of this invention by tenter chain 16 which grips the edges of the sheet and carry it through the process. Tenter chain 16 contains projections 17 which grip the upper faces of the sheet and help facilitate the advancing of the sheet.

The apparatus of this invention is comprised of means for disposing a sheet of formable, thermoplastic material between two counter-rotatable, polygonal, substantially contiguous forming bodies. In FIGS. 1 and 3, said means for disposing the thermoplastic material between the forming bodies is comprised of sheet 12, roll feeder 14, and bar guide advancer 18. As will be apparent to those skilled in the art, other means for disposing the thermoplastic material between the forming bodies also can be used in the apparatus of the invention. Thus, e.g., instead of using chains to advance the thermoplastic sheet, one may use belts which are contiguous with the upper and lower faces of the sheet.

Referring again to FIG. 1, thermoplastic sheet 12 is advanced to heater 20, where it is heated until it is formable. In general, the thermoplastic sheet is heated until it softens. Heat can be applied from one or both sides, and it often will be observed that the sheet sags as it softens. Then, with further heating, the sheet tightens up until it is flat. At this point, it is often nearly ready for forming, but it is usually better to allow another couple of units of time to pass before forming, depending upon the type of material used and its gauge.

Heater 20 can supply heat by any means well known to those skilled in the art. Thus, for example, it can supply heat by conduction, convection, and the like. Suitable means for heating thermoplastic sheet 12 include subjecting it to hot air, ultraviolet light, radiant heat, and the like.

In general, thermoplastic sheet 12 is heated to a temperature of from about 200 to about 500 degrees Fahrenheit in heater 20. In one preferred embodiment, heater 20 is comprised of ultraviolet lamps.

After being heated until it is formable in heater 20, formable thermoplastic sheet 12 is then fed to continuous rotary former 22. This continuous rotary former is shown, in perspective view, in FIG. 2. As is shown in FIG. 2, the thermoplastic material is fed between rotary former 22 where it is molded into a shaped thermoplastic article.

Figure 2:
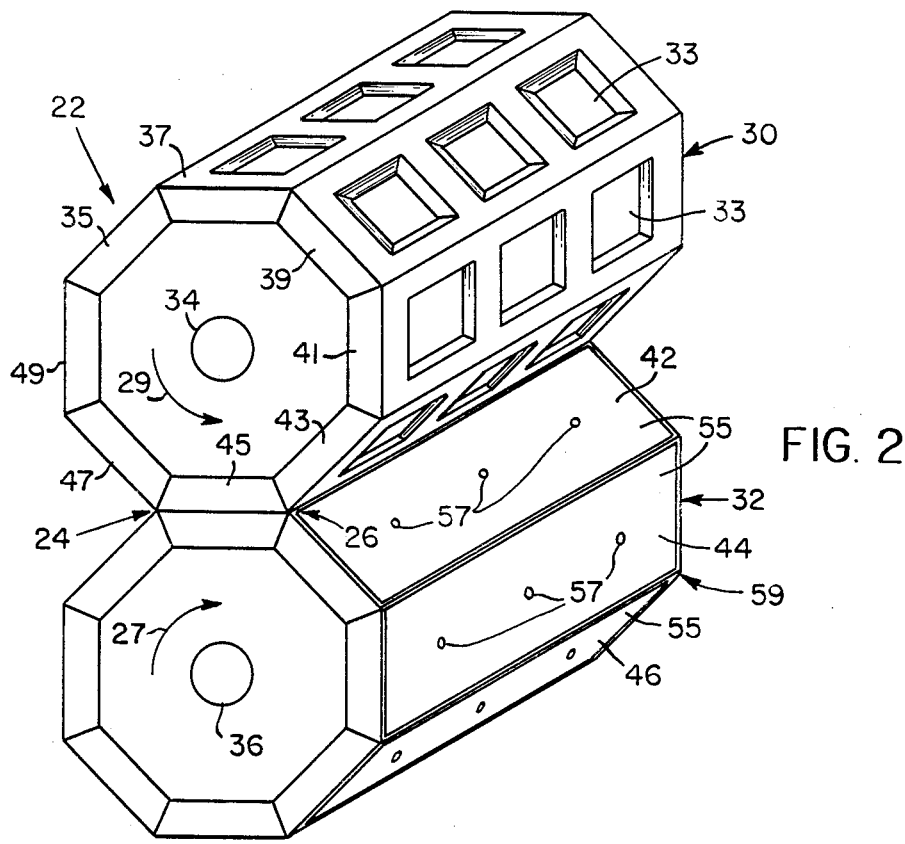
FIG. 2 is a perspective view of a preferred embodiment of the forming apparatus used in the process of this invention.

In the embodiment illustrated in FIGS. 1 and 2, rotary former 22 is comprised of at least two rotatable, polygonal forming bodies 30 and 32. The polygonal forming bodies 30 and 32 are provided with means for rotating them in a counter-rotatable manner. The term counter-rotatable, as used in this specification, refers to the rotation of one of the polygonal forming bodies in one direction and the rotation of the other polygonal forming body in the opposite direction. Thus, as is illustrated in FIG. 2, forming body 30 is rotated in the direction shown by arrows 27, and forming body 32 is rotated in the direction shown by arrows 29. Alternatively, forming body 30 can rotate in the direction shown by arrows 29, and forming body 32 can rotate in the direction shown by arrows 27.

The counter-rotatable forming bodies of this invention are polygonal. The term polygonal, as used in this specification, refers to a cross section which defines a closed plane figure bounded by at least three line segments. Thus, for example, in the embodiment illustrated in FIGS. 1 and 2, each of forming bodies 30 and 32 are octagonal.

It is preferred that each of forming bodies 30 and 32 have at least three sides. One or both of forming bodies 30 and 32 can have four sides; in this embodiment, it is preferred that the cross-sectional shape defined by the four sides be a square. Alternatively, one or both of the forming bodies 30 and 32 can have five sides, six sides, seven sides, eight sides, nine sides, ten sides, etc. There is no upper limit to the number of sides forming bodies 30 and 32 can have.

In one preferred embodiment, the cross-sectional shape defined by forming body 30 is identical to the cross-sectional shape defined by forming body 32. In an even more preferred embodiment, each of the sides of forming body 30 and/or forming body 32 are equal in length.

Figure 5:
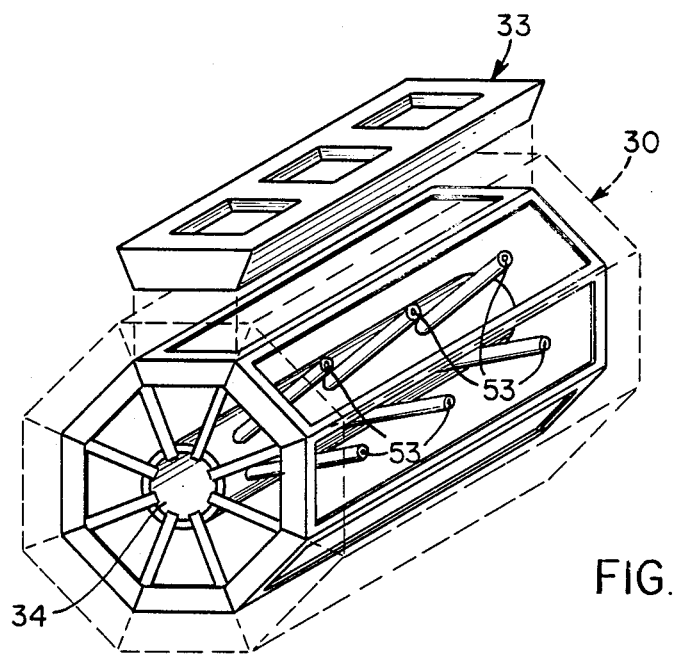
FIG. 5 illustrates one preferred embodiment of said polygonal forming bodies.

Forming bodies 30 and 32 preferably contain orifices 34 and 36 into which a coolant (such as water) may be introduced. Orifices 34 and 36 may also be used to remove heated coolant from bodies 30 and 32 and/or to introduce air into bodies 30 and 32 and/or to remove air from bodies 30 and 32. FIG. 5 illustrates one preferred embodiment in which air and/or coolant may be introduced towards or removed from the periphery of the forming body.

Orifices 34 and 36 are shown in FIGS. 1 and 2 on only one side of forming bodies 30 and 32. As will be appreciated by those skilled in the art, similar orifices (not shown) may be used at the other side (not shown) of forming bodies 30 and 32. Through said similar orifices may pass pipes (not shown) also carrying coolant and/or air under pressure. Alternatively, or additionally, said pipes or lines may remove air and/or heated coolant.

Each of forming bodies 30 and 32 is comprised of conventional means for cooling one or more of the faces of the body and/or conventional means for supplying air to one or more faces of the body and/or conventional means for removing air from one or more faces of the body. Thus, referring to FIG. 2, each of forming bodies 30 and 32 has means for circulating cool water on the inside of said body to cool the faces of the body and means for removing heated water from the inside of said body. In addition, forming body 32 comprises means for supplying air to the faces of the body so that, when formable thermoplastic sheet is in contact with one of said faces, it is pushed away therefrom by air pressure. Forming body 30 comprises means for removing air from the face of the body so that when the formable thermoplastic sheet is in contact with one of said faces it is pulled towards said face by the vacuum so formed in addition to being pushed towards said face by the air pressure from the face of forming body 32.

Referring to FIG. 5, means for cooling the forming body, means for withdrawing air through the periphery of the forming body, and means for supplying air under pressure through the periphery of the forming body are illustrated in the preferred embodiment shown. In FIG. 5, said means are shown for only one of the forming bodies. It is to be understood, however, that it is preferred that both of the forming bodies be comprised of means for cooling the forming body, means for withdrawing air through the periphery of the forming body, and means for supplying air under pressure through the periphery of the forming body.

Forming body 30 is shown in partial cross-section. This forming body is comprised of a multiplicity of molding plates 33, although only one such molding plate 33 is shown in FIG. 5. It is preferred that each face of the forming body 30 contain at least one molding plate and, more preferably, at least two molding plates. Thus, as illustrated in FIG. 2, each of faces 35, 37, 39, 41, 43, 45, 47, and 49 of forming body 30 has at least one molding plate on its surface and, preferably, at least two such molding plates. As will be apparent to those skilled in the art, the size, depth, and configuration of the molding plate will vary with the configuration of the part to be molded.

Pipes (not shown) extend through orifice 34 and communicate with pipes 53. These pipes conduct fluid to and from the periphery of the forming body.

Referring again to FIG. 5, pipes 53 supply air under pressure to the periphery 55 of forming body 32, which acts as a pressure plate. This pressurized air escapes through orifices 57 and, when the pressure plate face of forming body 32 is in contact with the molding face plate of forming body 30, tends to push thermoplastic sheet 12 towards the molding face plate. It is preferred that pipes 53 also supply coolant to periphery 55 of forming body 32.

Pipes 53 also withdraw air from the periphery of forming body 30. This air under vacuum tends to pull thermoplastic sheet 12 towards the molding face plate.

Referring again to FIG. 5, in orifice 34 is preferably located a regulating device, not shown, which controls what station does what at what time. In one preferred embodiment, said regulating device is electronic in nature.

It is preferred that each station on the frame of the apparatus has a coolant in lead, a coolant out lead, an air pressure in lead, and an air pressure out (vacuum) lead. More leads can be added, as needed. The molding plate body (forming body 30) and the pressure plate body (forming body 32) may comprise the same number and types of leads and may have the same configurations. The height of forming body 30 and forming body 32 can be varied, depending upon the particular forming need.

Referring again to FIG. 2, each face of forming body 32 forms a pressure box. Three of said pressure plate faces (stations), faces 42, 44, and 46, are illustrated in FIG. 2. Each of these faces comprise air holes 57 through which air supplied from line 53 (not shown) passes. The other faces of forming body 32, now shown, are similar or identical in configuration to faces 42, 44, and 46.

Forming body 30, the molding plate, is comprised of conventional means (not shown in FIG. 2, but illustrated in FIG. 5) for applying suction to the faces of the forming body. Thus, for example, each mold on each of the faces of forming body 30 is preferably independently cooled and pressurized by conventional cooling and pressurizing means.

Referring again to FIG. 2, forming body 30 is comprised of faces 35, 37, 39, 41, 43, 45, 47, and 49. The configurations of faces 39, 41, and 43 are shown in FIG. 2; the configurations of faces 35, 37, 45, 47, and 49 are preferably substantially identical to those of faces 39, 41, and 43.

Each of faces 35, 37, 39, 41, 43, 45, 47, and 49 are comprised of one or more molds; three molds are shown for faces 39, 41, and 43, but fewer or more units may be used. The mold used for each face may be a male mold (in which case it extends upwardly from the base of the mold), or it may be a female mold (in which case it is indented in the mold).

In the preferred embodiment illustrated in FIG. 2, each of the pressure plates is comprised of a pressure seal 59 which may, e.g., be in the form of a gasket.

Forming bodies 30 and 32 are counter-rotatable. As used in this specification, the term counter-rotatable means that forming bodies 30 and 32 are so configured vis-a-vis each other, and means for rotating the forming bodies, so that forming body 30 always rotates in a direction opposite to that of forming body 32.

Forming bodies 30 and 32 are substantially contiguous. As used in this specification with reference to forming bodies 30 and 32, the term substantially contiguous means that, throughout at least the entire length of each of forming bodies 30 and 32, there is at least one point in which thermoplastic sheet 12 is in contact with a face of both forming body 30 and a face of forming body 32. In addition to meaning that the forming bodies are contiguous with the thermoplastic sheet, the term substantially contiguous also means that the forming bodies are maintained so close to each other that, with thermoplastic sheet 12 interposed between them, the rotation of the forming body in one direction causes the other forming body to rotate in the other direction.

The apparatus of this invention is comprised of means for compressing said two counter-rotatable polygonal bodies to maintain them in a substantially contiguous condition. Thus, both forming body 30 and forming body 32 are held close together during rotation by pressure (linear compression) and keeping each other in track. The compression of the forming bodies is maintained during both the molding step and the rotation steps.

Figure 4:
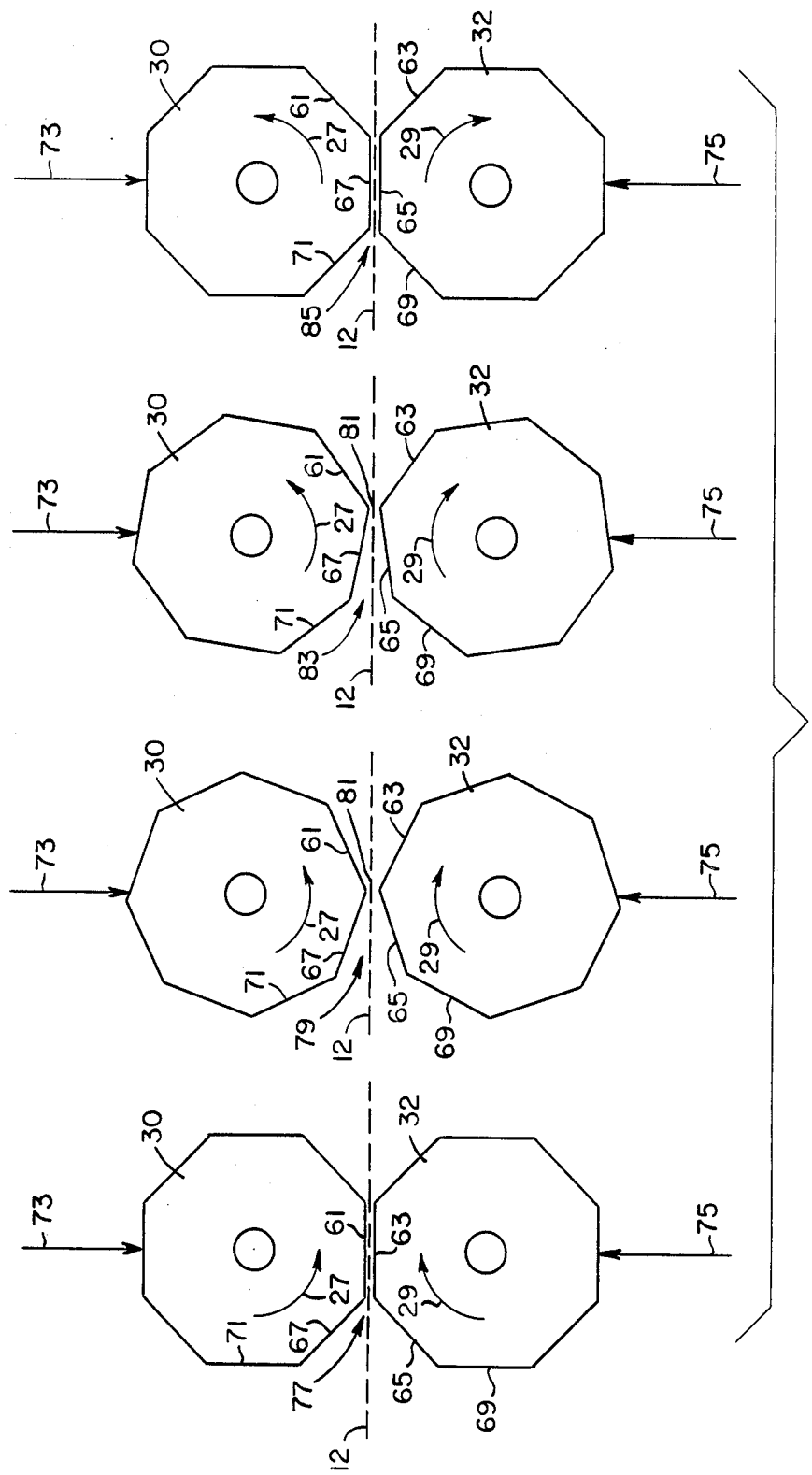
FIG. 4 illustrates the synchronous counter-rotation of the polygonal, substantially contiguous forming bodies of the apparatus of this invention.

FIG. 4 illustrates how the forming plates 30 and 32 preferably advance throughout the forming cycle. Forming bodies 30 and 32 are compressed in the directions of arrows 73 and 75 by conventional means.

At point in time 77, substantially all of face 61 of body 30 and face 63 of body 32 are "substantially contiguous." The pressure exerted in directions 73 and 75 facilitates the molding of thermoplastic material 12 on molding face 61.

At point in time 79, forming bodies 30 and 32 have rotated. However, because of the compression in directions 73 and 75, face 61 of body 30 and face 63 of body 32 are substantially contiguous at point 81.

At point in time 83, the forming bodies have rotated a bit further.

At point in time 85, the forming bodies have rotated further to a point where substantially all of face 67 of body 30 and face 65 of body 32 are "substantially contiguous." The pressure exerted in directions 73 and 75 facilitates the molding of thermoplastic material 12 in molding face 67.

It is preferred that a specified amount of pressure be maintained upon the forming plate 30 and the forming plate 32 during the forming (times 77 and 85) as well as the times when the stations are advancing (times 79 and 83). The means for compressing the forming stations may be similar to that of an automobile shock system.

Both the molding plate 30 and the pressure plate 32 are kept on track, running in unison with the forming material between them.

In one embodiment, the rotation of forming bodies 30 and 32 helps to advance thermoplastic material 12.

Any conventional frame may be used to support forming bodies 30 and 32. The height of the molding plate (forming body 30) and the pressure plate (forming body 32) may vary. The compression system which keeps bodies 30 and 32 together can be adjusted to accommodate any height change.

In the operation of the process of this invention, a sheet of formable thermoplastic material is provided. It is fed in between forming body 30 and forming body 32 so that it is disposed on one or more of the molds on forming body 30, and it is pushed and pulled towards the mold by the combination of air pressure from forming body 32 and suction from forming body 30. Thereafter, the formed thermoplastic body need not be ejected from the mold immediately; it may be retained in the mold until the molding bodies have rotated at least several degrees. This is substantially advantageous, for the formed thermoplastic article is not removed from the mold immediately, it has a chance to cool, and thus its shrinkage is substantially less than it would be if it were removed from the mold immediately after it was formed.

Referring again to FIG. 1, the formed plastic articles which are formed at or about point 80 are not discharged from the mold until the formed article has undergone a substantial amount of cooling. Thereafter, the formed articles travel until they are transported to filling/sealing station 84 wherein the articles are filled and/or sealed by means well known to those skilled in the art. Thereafter, the formed articles travel to dieing, sorting, and packing station 86.

In the embodiment illustrated in FIG. 1, controller 88 may be used to control, and synchronize, the timing and movements of thermoplastic sheet 12, forming body 30, forming body 32, means for compressing the forming bodies, and the like.

It is to be understood that the foregoing description is illustrative only and that changes can be made in the apparatus, the ingredients, and their proportions, and in the sequence of combinations and process steps as well as in other aspects of the invention discussed herein without departing from the scope of the invention defined in the claims, especially if it contains the following preferred features: (1) all of the molding plates are connected to each other, being contiguous and having no gaps; (2) all of the pressure plates are connected to each other, being contiguous and having no gaps; (3) each of the forming bodies, whose shape is defined by the contiguous plates, is contiguous; (4) a compression system keeps the polygonal units together; (5) each of the forming bodies keeps each other in track. In this preferred embodiment, forming preferably takes place when the surfaces of the polygonal pressure plate and the polygonal molding plate are substantially parallel, and the thermoplastic sheet 12 is between these surfaces and is substantially parallel to them; at this time, a vacuum (negative pressure) is drawn on the mold surface of that particular forming station, and air pressure is forced out of the pressure plate. It is preferred that, before parallelity is broken, either the positive and/or the negative pressure will be cut off so that the stations can be advanced.

I claim:

1. An apparatus for the vacuum thermoforming of a formable thermoplastic sheet material comprising two counter-rotatable, polygonal, substantially contiguous forming bodies, means for disposing said formable thermoplastic sheet material between said two counter rotatable, polygonal, substantially contiguous forming bodies, means for rotating said two polygonal forming bodies in a counter-rotatable manner, means for maintaining said two counter-rotatable, polygonal forming bodies in a substantially contiguous condition whenever said formable thermoplastic sheet material is disposed between said forming bodies, and means for compressing said two polygonal forming bodies so that they are substantially contiguous whenever said formable thermoplastic sheet material is disposed between said forming bodies, wherein:
   (a) said two polygonal forming bodies, each having a continuous polygonal surface periphery, are comprised of means for cooling at least one of said bodies, means for supplying air under pressure to the periphery of at least one of said forming bodies, means for withdrawing air from the periphery of at least one of said forming bodies, and a multiplicity of plates immovably disposed on said periphery and maintaining said continuous polygonal surface periphery of each of said two polygonal forming bodies,
   (b) the first of said two polygonal forming bodies is comprised of a multiplicity of molding plates disposed on said periphery;
   (c) the second of said two forming bodies is comprised of a multiplicity of pressure plates disposed on said periphery; and
   (d) each of said first and second forming bodies has a cross-sectional shape which is substantially identical to the cross-sectional shape of the other of said two forming bodies.

2. The apparatus as recited in claim 1, wherein each of said two forming bodies is comprised of means for cooling said forming body, means for withdrawing air through the periphery of said forming body, means for supplying air under pressure through the periphery of said forming body, and a multiplicity of plates disposed on said periphery.

3. The apparatus as recited in claim 2, wherein each of said first and said second two counter-rotatable polygonal bodies has a cross-sectional shape each of whose sides is substantially equal to each of its other sides.

4. The apparatus as recited in claim 3, wherein each of said molding plates is contiguous with other molding plates.

5. The apparatus as recited in claim 4, wherein each of said pressure plates is contiguous with other pressure plates.

6. The apparatus as recited in claim 5, wherein each of said first and said second two counter-rotatable polygonal bodies is comprised of at least one orifice.

7. The apparatus as recited in claim 6, wherein each of said first and said second two counter-rotatable polygonal bodies is comprised of at least two orifices.

8. The apparatus as recited in claim 7, wherein a multiplicity of male molds is disposed on the periphery of one of said two polygonal forming bodies.

9. The apparatus as recited in claim 7, wherein a multiplicity of female molds is disposed on the periphery of the first of the two polygonal forming bodies.

10. The apparatus as recited in claim 7, wherein said means for disposing a sheet of formable thermoplastic material between said two polygonal forming bodies is comprised of a tenter chain.

11. The apparatus as recited in claim 10, wherein said tenter chain comprises projections which can grip a face of said thermoplastic sheet material.

12. The apparatus as recited in claim 11, wherein said means for disposing a sheet of formable thermoplastic material is comprised of a heater.

13. The apparatus as recited in claim 12, wherein each of said polygonal forming bodies is comprised of at least four sides.

14. The apparatus as recited in claim 13, wherein each of said polygonal forming bodies is comprised of at least five sides.

15. The apparatus as recited in claim 14, wherein each of said polygonal forming bodies comprises means for circulating cool water on the inside of said body.

* * * * *